"EXCLUSIVE OR" GATE

Filed April 26, 1957

INVENTORS
ALAN R. GARFINKEL
STANLEY OKEN
BY Victor D. Borst
ATTORNEY.

2,868,999

"EXCLUSIVE OR" GATE

Alan R. Garfinkel, Forest Hills, and Stanley Oken, Utica, N. Y., assignors to The Sperry Rand Corporation, Ford Instrument Company Division, Long Island City, N. Y., a corporation of Delaware Application April 26, 1957, Serial No. 655,439

6 Claims. (Cl. 307—88)

This invention relates to electronic computers and more particularly to gating devices employed as components thereof for opening and blocking circuit channels in accordance with predetermined voltage level patterns of the inputs to the gate.

In the electronic art to date, gating devices known as coincidence or "and" gates and gating devices known as "or" gates are in general use, especially in the digital computer field. Without complex associated circuitry neither type of gating device will provide an output only on the condition that the state of two inputs to the device are different. The conventional "and" gate does not satisfy this requirement in that it provides an output when the two inputs are simultaneously present and their state is the same. The gating circuitry having our particular conditions for performance is hereinafter referred to as an "exclusive or" gate which has been provided hitherto by introducing an inhibition stage in the input to a coincidence gate. In addition to the complexity of the circuits of the so-called "exclusive or" gate they have conventionally employed vacuum tubes. The disadvantages associated with vacuum tubes include limited life, considerable power drain, fragility and undue weight. These disadvantages narrow their fields of application.

A principal object of this invention is to provide improved circuit means for yielding an output only when its two inputs are dissimilar.

Another object of this invention is to provide a more efficient gating circuit from the standpoint of power transfer.

Still another object of this invention is to provide a small, light weight and robust "exclusive or" gate.

In general, the invention resides in the utilization of a saturable magnetic reactor having a core selected from the class known as square loop materials. As presently contemplated, there is provided such a magnetic core having three principal windings and one auxiliary winding. One of the principal windings is energized by an input signal pulse, one winding is energized by a clock pulse and the other winding is the output winding, the input signal pulse winding being oppositely wound to the clock pulse and output windings. With such winding arrangements, an output pulse is generated by a clock pulse when an input pulse is not present and conversely, no output is generated when an input pulse is present. A reset pulse which is generated subsequent to every clock pulse biases the reactor core to a state of negative magnetic saturation through an auxiliary winding, the auxiliary winding being polarized to induce a flux in opposition to the flux of the clock pulse. The input side of the gate device is internally connected to its output side through two branch circuits, the two branches having a shunting circuit connected therebetween. One of the branch circuits is a series circuit of a resistor and a unidirectional rectifier so as to permit direct conductance from the input side to the output side of the gating circuit, provided that the shunting circuit does not prevent such signal transference. The other branch circuit has a saturable reactor which generates pulses only when the input signal is not present. The shunting branch has a switch and the on-off state of this switch is the factor that constitutes the other input to the gating circuitry. The desired function is to produce an ouput whenever either the input signal occurs when the switch is open or the switch is closed in the absence of an input signal. Additionally, the output is to be blocked whenever a coincidence occurs with respect to the state of the switch and the state of the input signal pulse. Whenever the switch is closed and in the absence of an input signal pulse, the induced clock pulse in the output winding of the saturable reactor will be conducted to the output side of the device through a second unidirectional rectifier disposed in its conductance path. In the absence of an input signal and for the condition that the switch is in "off" or open state, the second unidirectional rectifier is back biased by a D. C. potential in the shunting branch so that the signal generated by the clock pulse is blocked in the output side of the gate circuitry. In the proposed circuitry, the switch is connected in a series circuit with a third unidirectional rectifier so that any input signal in the first branch will be blocked from the output side of the gate device by shunting circuitry which effectively short circuits the input signal to ground whenever the switch is closed.

The features and other objects of the invention will be understood more clearly from the following detailed description taken in conjunction with the accompanying drawings, in which.

Figure 1:
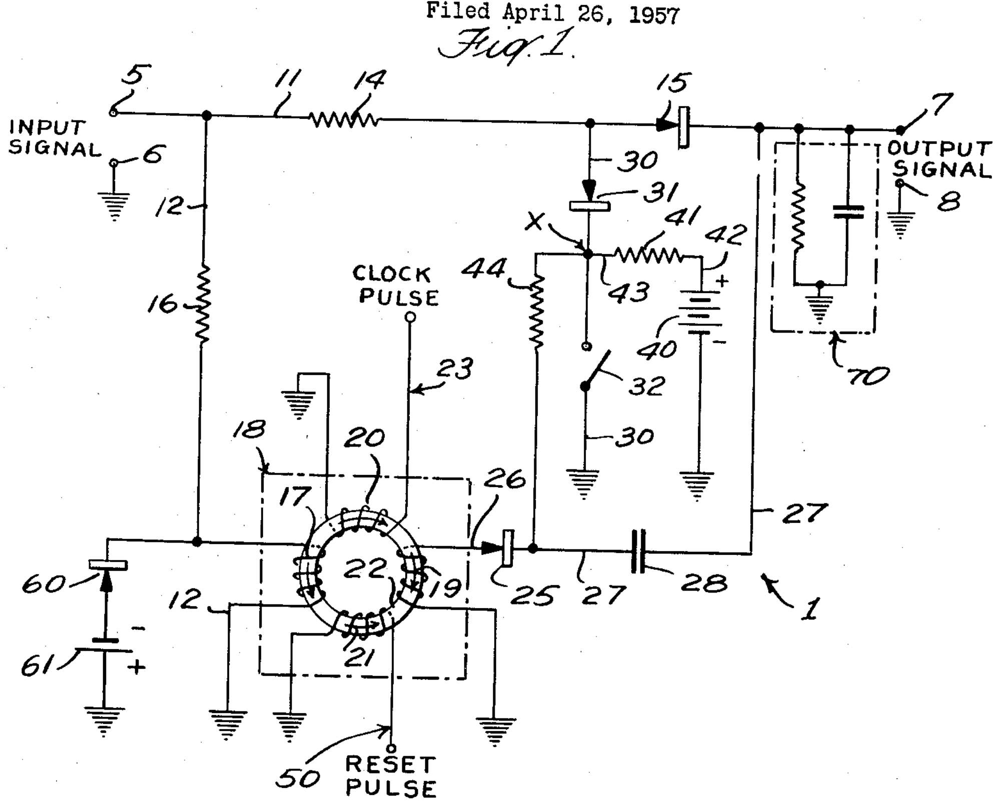
Fig. 1 is a schematic diagram of an "exclusive or" gate.

Referring to the schematic diagram of Fig. 1, the gating system 1 has a pair of input terminals 5 and 6 and a pair of output terminals 7 and 8, the terminals 6 and 8 being grounded. The input pair of terminals 5 and 6 are connected to receive rectangular pulses having two voltage levels, viz., a reference level corresponding to "0" and a higher potential level corresponding to "1." The input circuit has two branch circuits 11 and 12, branch circuit 11 being connected between the input terminal 5 and the output terminal 7. Branch circuit 12 is connected across the pair of input terminals 5 and 6. Branch circuit 11 is a series circuit having a resistor 14 and a half wave rectifier 15, the rectifier being poled from the input terminal 5 to the output terminal 7.

Branch circuit 12 is a series circuit having a resistor 16 and an input winding 17 of a saturable reactor 18. The saturable reactor 18 comprises the input winding 17, an output winding 19, a clock winding 20 and a reset winding 21 disposed upon a magnetic core 22 which is formed of square loop material. The input winding 17 is wound oppositely to the output and clock windings 19 and 20, respectively. The clock winding 20 is connected to a clock circuit 23 which generates clock pulses from equipment not shown. The input winding 17 and the clock winding 20 are arranged so that simultaneous pulses in the windings will induce fluxes which will cancel each other in the core 22. Hence an output will be induced in the output winding 19 by the clock pulse only when there is no pulse in the winding 17. One terminal of the output winding 19 is connected to a half wave rectifier 25 by a conductor 26, the rectifier being poled away from the winding, and the other terminal of the output winding being grounded. The other side of the half wave rectifier 25 is connected to the output terminal 7 by a conductor 27, this conductor having a blocking condenser 28 provided therein.

A shunting branch 30 is connected across branch circuit 11 at the junction of the resistor 14 and the half wave rectifier 15. Shunting branch 30 is a series circuit having a half wave rectifier 31 and a switch 32, the rectifier 31 being poled from the branch circuit 11 to the switch 32. The positive terminal of a D. C. potential source 40 is connected to a current limiting resistor 41 by a conductor 42, the negative side of the voltage source being grounded. The other side of the resistor 41 is connected to the shunting circuit 30 by a conductor 43 at the junction point X of the rectifier 31 and the switch 32. A resistor 44 is connected from the point X to the junction between the rectifier 25 and the blocking condenser 23. The driving device for the input circuit connected to terminals 5 and 6 may be either a nonregenerative circuit such as a cathode follower or a regenerative circuit such as a block oscillator. In the latter case, it is advisable to shunt a half wave rectifier 60 in series connection with a small D. C. source 61 across the input winding 17 so as to prevent spurious firing of the regenerative circuit by the reset pulse in the winding 21. The half wave rectifier 60 is poled with its anode connected to the negative side of source 61 and its cathode connected to winding 17.

The on-off state of switch 32 is the factor that constitutes the other input to the gate circuitry. When the switch 32 is open it represents state "0" and when it is closed it represents state "1."

Figure 2:
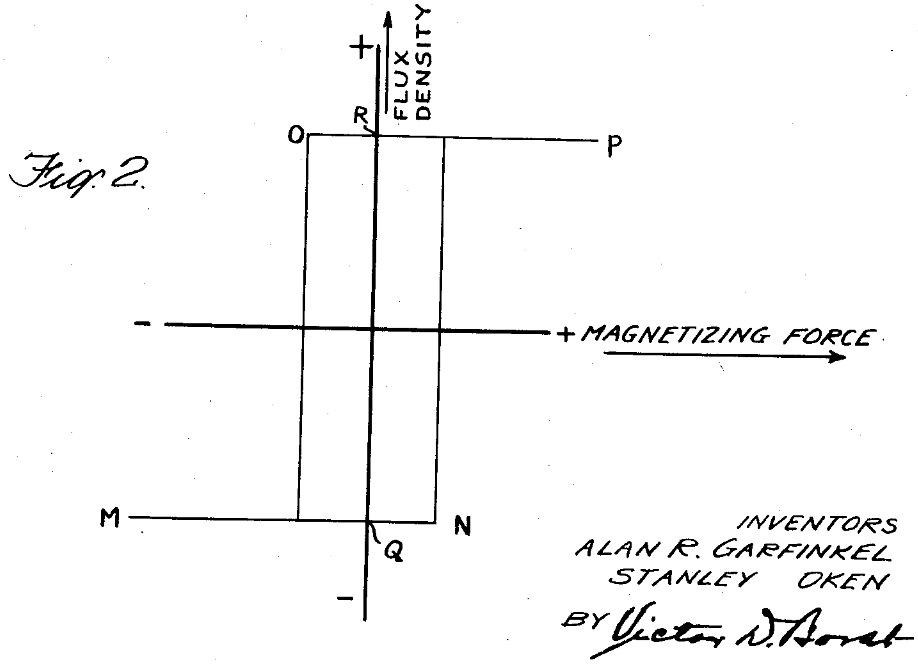
Fig. 2 is a diagram which illustrates the flux density changes in the core of the saturable reactor during switching operations.

In Fig. 2 there is represented the idealized B–H or flux density vs. magnetizing force diagram of the core 22. The reset winding 21 of Fig. 1 is connected to a reset circuit 50 which receives a delayed pulse from the clock circuit. The reset winding induces a flux in the core 22 which is opposite to the flux induced by the clock winding 20 and the reset winding has sufficient ampere turns to return the flux density in the core 22 to the negative saturation level M after every clock pulse. As stated hereinbefore, a simultaneous input pulse and clock pulse will not induce an output in the winding 19 and for this condition the flux density in the core 22 remains at M. If a clock pulse occurs in the absence of an input pulse, the flux density changes from the negative saturation level M to the positive saturation level P along the path QNPR and thereby induces a voltage in the output winding 19. The subsequent reset pulse in winding 21 returns the flux density to M. A filter 70 of conventional design is connected across the output terminal 7 and 8 in order to suppress unwanted transients which are originated by the switching action of the saturable reactor 18.

The gating action of the disclosed circuitry will now be considered for four cases, viz: Case A, input signal "off" and switch position "0"; case B, input signal "on" and switch position "1"; case C, input signal "off" and switch position "1"; case D, input signal "on" and switch position "0." It is desired that in cases A and B no output is produced and the gate is "closed" while in cases C and D an output is generated and the gate is "open."

For case A, (input off, switch open), the pulse induced in the output winding 19 is prevented from reaching the output terminal 7 and 8 by selecting the D. C. voltage source 40 to back bias the half wave rectifier 25 so as to block the pulse in the output winding 19.

For case B, (input on, switch closed), no pulse is generated in the output winding 19 when the clock pulse occurs, and the input signal in branch 11 is shunted to ground through the branch 30. Since the output terminals are then connected across the forward resistance of the rectifier 31, they receive substantially zero signal.

For case C, (input off, switch closed), the switch 32 connects the point X to ground potential. This removes the back-bias from the rectifier 25 and the generated pulse in the output winding 19 is conducted to the output terminals 7 and 8.

For case D, (input on, switch open), the input signal is conducted from the input pair of terminals 5 and 6 to the output pair of terminals 7 and 8 through the branch circuit 11. One application of the invention may be employed in conjunction with a plurality of binary coded signal circuits in which the disclosed gate circuitry is provided for each of the coded circuits.

It is to be understood that various modifications of the invention other than those above described may be effected by persons skilled in the art without departing from the principle and scope of the appended claims.

What is claimed is:

1. A signal gating system having a pair of input terminals and a pair of output terminals and comprising a circuit including two branch circuits, the first branch circuit including a first resistor and a first unidirectional device connected in series between one input and one output terminal, the second branch circuit being connected across said pair of input terminals, a magnetic core of a material having a substantially square loop characteristic, an input winding, a clock winding, a reset winding, an output winding, said windings being disposed on said magnetic core, the said output winding being wound in opposite sense to the said input winding, said input winding being included in the second branch circuit, a second unidirectional device, said output winding being connected in series with said second unidirectional device, said series combination of said output winding and said second unidirectional device being connected across said pair of output terminals, said clock winding being adapted to receive pulsating signals and sensed to induce a flux in said magnetic core in opposition to the flux induced by the said input winding, said reset winding being also adapted to receive pulsating signals, said reset winding being sensed to induce a flux in said magnetic core which is opposite to the flux induced by the said clock winding, a shunting branch circuit connected to said first branch circuit at the junction between said first resistor and said first unidirectional device, said shunting branch including a third unidirectional device and a switch in series connection, a D. C. voltage source, a second resistor connected in series with said D. C. voltage source, the series combination of the said second resistor and the said D. C. voltage source being connected to said shunting circuit at the junction between said third unidirectional device and said switch and a third resistor connected between the junction of said third unidirectional device and said switch in said shunting branch and the junction of the said second unidirectional device and said output terminals, said first and third unidirectional devices being poled away from the said first resistor and said second unidirectional device being poled away from said output winding.

2. A signal gating system as claimed in claim 1 wherein a blocking condenser is included in the connection between one output terminal and the said second unidirectional device.

3. A signal gating system as claimed in claim 1 wherein a fourth resistor is connected in the said second branch circuit.

4. A signal gating system as claimed in claim 1 wherein there is provided a fourth unidirectional device and a D. C. source in series connection with said fourth unidirectional device, the said series connection being connected across said input winding.

5. A signal gating system as claimed in claim 1 wherein a filter is connected across said output pair of terminals.

6. A signal gating system having an input and output terminal, an input circuit comprising two branch circuits, one of said branch circuits being connected between said input and output terminal, a magnetic core of a material having a substantially square loop characteristic, the other of said branch circuits having an input winding disposed on said magnetic core and being connected to said input terminal, a clock pulse circuit having a clock winding disposed on said magnetic core and a reset pulse circuit having a winding disposed on said magnetic core and sensed oppositely to the clock pulse winding, a conductor circuit connected to said output terminal and having an output winding disposed on said magnetic core, said input winding being sensed oppositely to said clock and output windings, a shunting branch circuit connected to the said one branch circuit of the input circuit between said input and output terminals, said shunting circuit having a make and break switch and a unidirectional device disposed therein, a battery circuit connected to said conductor circuit and to said shunting circuit at a point located between the said one branch circuit and the make and break switch, an impedance device in said conductor circuit disposed between said output winding and the connection point of the battery circuit and the conductor circuit, said battery circuit being adapted to block induced pulses in the conductor circuit by effectively back biasing said impedance device when the switch in said shunting circuit is open, and the oppositely sensed input and clock windings have the same ampere turns whereby induced pulses in said output winding and conductor circuit are precluded when pulses in the input and clock windings occur concurrently.

References Cited in the file of this patent

UNITED STATES PATENTS

| | | |
|---|---|---|
| 2,695,993 | Haynes | Nov. 30, 1954 |
| 2,741,757 | Devol et al. | Apr. 10, 1956 |
| 2,741,758 | Cray | Apr. 10, 1956 |
| 2,751,509 | Torrey | June 19, 1956 |